United States Patent
Hemena et al.

(10) Patent No.: US 6,249,411 B1
(45) Date of Patent: Jun. 19, 2001

(54) OVER-VOLTAGE PROTECTION CIRCUIT AND METHOD FOR PREVENTING SYSTEM SHUTDOWN IN A POWER SYSTEM EMPLOYING MULTIPLE POWER SUPPLIES

(75) Inventors: William Hemena, Raleigh; Randhir S. Malik, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,480

(22) Filed: Oct. 7, 1999

(51) Int. Cl.$^7$ .................................................. H02H 7/00
(52) U.S. Cl. ........................... 361/91.5; 361/86; 361/18
(58) Field of Search .................... 361/91.1, 91.5, 361/86, 18; 307/85–86; 323/274–276, 284

(56) References Cited

U.S. PATENT DOCUMENTS

| | | | |
|---|---|---|---|
| 4,412,265 | 10/1983 | Buuck | 361/18 |
| 4,455,586 | 6/1984 | McCartney | 361/56 |
| 4,544,983 | 10/1985 | Anderson et al. | 361/119 |
| 4,644,440 | 2/1987 | Kenny et al. | 361/111 |
| 5,499,154 | * 3/1996 | Cullison | 361/18 |
| 5,576,920 | 11/1996 | Kosuga et al. | 361/56 |
| 5,786,641 | * 7/1998 | Nakanishi et al. | 307/64 |

OTHER PUBLICATIONS

Dialog Japanese Patent Abstract, JP 58 127224 A, Lul. 29, 1983.

* cited by examiner

*Primary Examiner*—Michael J. Sherry
(74) *Attorney, Agent, or Firm*—J Bruce Schelkopf; Bracewell & Patterson, LLP

(57) ABSTRACT

An over-voltage protection circuit for use with a power converter having an output inductor and an isolation diode coupled to an output terminal of the power converter. The over-voltage protection circuit includes a comparison circuit that compares sensed voltages from the anode and cathode nodes of the isolation diode and, in response to the anode having a lower voltage than the cathode, generates a drive signal. The drive signal is received by an active bleed circuit, coupled to the output terminal of the power converter, that provides a current path to keep current flowing through the output inductor to prevent the power converter from going into a discontinuous conduction (DCM) mode of operation.

20 Claims, 4 Drawing Sheets

ND METHOD FOR PREVENTING SYSTEM

OVER-VOLTAGE PROTECTION CIRCUIT AND METHOD FOR PREVENTING SYSTEM SHUTDOWN IN A POWER SYSTEM EMPLOYING MULTIPLE POWER SUPPLIES

BACKGROUND OF THE INVENTION

1. Technical Field

The present invention relates generally to power conversion and in particular to power supplies. Still more particularly, the present invention relates to an over-voltage protection circuit for preventing system shutdown in a power system employing multiple power supplies and a method of operation thereof.

2. Description of the Related Art

Regulated DC power supplies are typically needed for most analog and digital electronic systems. Two major categories of regulated DC power are linear power supplies and switching power supplies. Generally, in linear power supplies, a transistor (operating in its active range) is connected in series with an input voltage source and the voltage drop across the transistor is automatically adjusted to maintain an output voltage at a desired level.

In switching power supplies, transformation of DC voltage from one level to another is accomplished typically by means of DC/DC converter circuits, such as step-down (buck) or step-up (boost) converter circuits. Solid-state devices, such as transistors, are operated as switches (either completely ON or completely OFF) within these switching converters. Since the power devices are not required to operate in their active region, this mode of operation results in lower power dissipation.

Furthermore, increasing switching speeds, higher voltage and current ratings of these power devices are some of the advantages that have increased the popularity of switching power supplies.

Switching power supplies that convert AC or DC input power into DC output(s) frequently have multiple outputs. These outputs are often derived from multiple secondary windings on a single power transformer. In a switching power supply, the primary winding of the a power transformer is switched or commutated to the input voltage source by power switches in such a way as to provide pulses at the appropriate current and voltage levels on the secondary outputs. The DC secondary outputs are formed via rectification and subsequent filtering of the pulse train on the transformer secondaries. Each DC output voltage level depends on a turns ratio of the respective secondary windings to the primary winding as well as the ratio of the pulse width to the switching period.

The DC output voltages are then directly or indirectly regulated by a control feedback circuit. Direct regulation occurs when the feedback circuit senses at least one of the DC outputs (usually called the main output) and then modifies the switching pattern of the power switches to compensate for the changes in the load or in the input voltage, thereby keeping the DC voltage level on the regulated main output relatively constant. The are many possible methods for switching power supply regulation including, for instance, pulse width modulation (PWM). PWM, as a matter of fact, is one of the more widely used control and switching method.

There is a growing demand, e.g., in the telecommunication and computer industries for increased current handling capabilities in the power supplies employed to provide regulated power to their equipment. A common approach to increase the current handling capacity of existing DC/DC power supplies is to add additional power stages to an already existing power supply. This distributive approach provides for greater expandability of a power system, permitting the utilization of lower current distribution buses. Furthermore, a distributive power system with the ability to use standard power supplies allows for redundancy, which in turn, increases the reliability of the entire power system. Examples of distributed power systems include the use of power supplies with their own individual input filters or different input buses. Other distributed systems may employ power supplies that share a common output bus, i.e., parallel outputs, for increased power or redundancy.

In a paralleled distributed redundant power system, i.e., the power supplies share a common output bus, an over-voltage condition is typically sensed before an isolation device, such as a diode, that is employed in each output terminal to provide electrical isolation between the paralleled outputs. This is to prevent shutdown of the entire power system in the event of an over-voltage fault on any one of the outputs of the paralleled power supplies. For example, if a +5V output common bus experiences an over-voltage condition due to a failure in one of the paralleled power supplies, the remaining "good" power supplies will not shutdown because of the over-voltage sense point being on the anode side of the isolation diode. A good power supply should never sense the over-voltage fault as its isolation diode becomes reverse biased for an over-voltage condition on the common bus.

Distributed power systems, however, have inherent shortcomings. Whenever anyone of the outputs is in an over-voltage condition, the anode voltage of an isolation diode in a good power supply becomes lower than its corresponding cathode voltage. Once its isolation diode becomes reverse biased, the power supply cannot conduct power to the common bus to power a load. Since the power supply regulation sense point is located at the cathode of its isolation diode, the power supply is forced to operate in a skip or discontinuous mode. The situation is further exacerbated if the output that suffered an over-voltage condition happens to be the "master" output for a multiple output power supply. Once the power supply under fault is powered down, the common bus voltage begins to decay until the regulation control loop responds. Under medium to full load condition, the output voltage may drop to below a regulation point, resulting in the loss of a "power good" signal, which in turn, will initiate shutdown of the entire system.

Accordingly, what is needed in the art is an improved power supply that mitigates the above mentioned limitations. In particularly, there is a need in the art for an over-voltage protection circuit for preventing system shutdown in a power system employing multiple power supplies.

SUMMARY OF THE INVENTION

It is therefore an object of the present invention to provide an improved power supply.

It is another object of the present invention to provide an over-voltage protection circuit for preventing system shutdown in a power system employing multiple power supplies and a method of operation thereof.

To achieve the foregoing objects, and in accordance with the invention as embodied and broadly described herein, an over-voltage protection circuit for use with a power converter having an output inductor and an isolation diode coupled to an output terminal of the power converter is disclosed. The over-voltage protection circuit includes a comparison circuit that compares sensed voltages from the anode and cathode nodes of the isolation diode and, in response to the anode having a lower voltage than the cathode, generates a drive signal. The drive signal is received by an active bleed circuit, coupled to the output terminal of the power converter, that provides a current path to keep current flowing through the output inductor to prevent the power converter from going into a discontinuous conduction (DCM) mode of operation.

In a related embodiment of the present invention, the over-voltage protection circuit further includes a compensation circuit that is coupled to an error amplifier, which in turn, compares a sensed output voltage of the power converter to a reference voltage and, in response thereto, generates an error signal to regulate the output voltage of the power converter. The compensation circuit prevents the error amplifier that is typically constructed using an operational amplifier, configured as a comparator, from drifting into a saturation mode.

The present invention discloses a novel over-voltage protection circuit utilizing an active bleed circuit that recognized when an over-voltage condition has occurred on a common bus and, in response thereto, provides a current path to keep a current flow through an output inductor of a good power supply. Consequently, the good power supply continues to operate in a continuous conduction mode. Additionally, the present invention also discloses a novel compensation circuit that simulates "normal" operating conditions to prevent an error amplifier (constructed utilizing an operational amplifier), used to generate an error signal for regulation control, from drifting into a saturation mode.

In one embodiment of the present invention, the comparison circuit includes an operational amplifier (op-amp) configured as a comparator. Also, in a related embodiment of the present invention, the active bleed circuit includes a controllable switch series-coupled to an impedance, such as a resistance. A drive signal generated by a comparator in the comparison circuit controls the operation of the controllable switch.

In another embodiment of the present invention, the controllable switch is a power transistor, such as a metal-oxide-semiconductor field effect transistor (MOSFET). Alternatively, in another advantageous embodiment, the power transistor employed may be an insulated gate bipolar transistor (IGBT) or a gate turn-off thyristor (GTO).

In yet another embodiment of the present invention, the power converter is a DC/DC converter. In an embodiment of the present invention to be illustrated and described hereinafter, a buck conveter is utilized. Alternatively, other converter toplogies, such as boost or flyback, may also be advantageously employed. Those skilled in the art should also readily appreciate that the power converter may be, in another embodiment, a AC/DC power converter. The present invention does not contemplate limiting its practice to any one particular type, or topology, of power converters.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DESCRIPTION OF ILLUSTRATIVE EMBODIMENT

Figure 1:
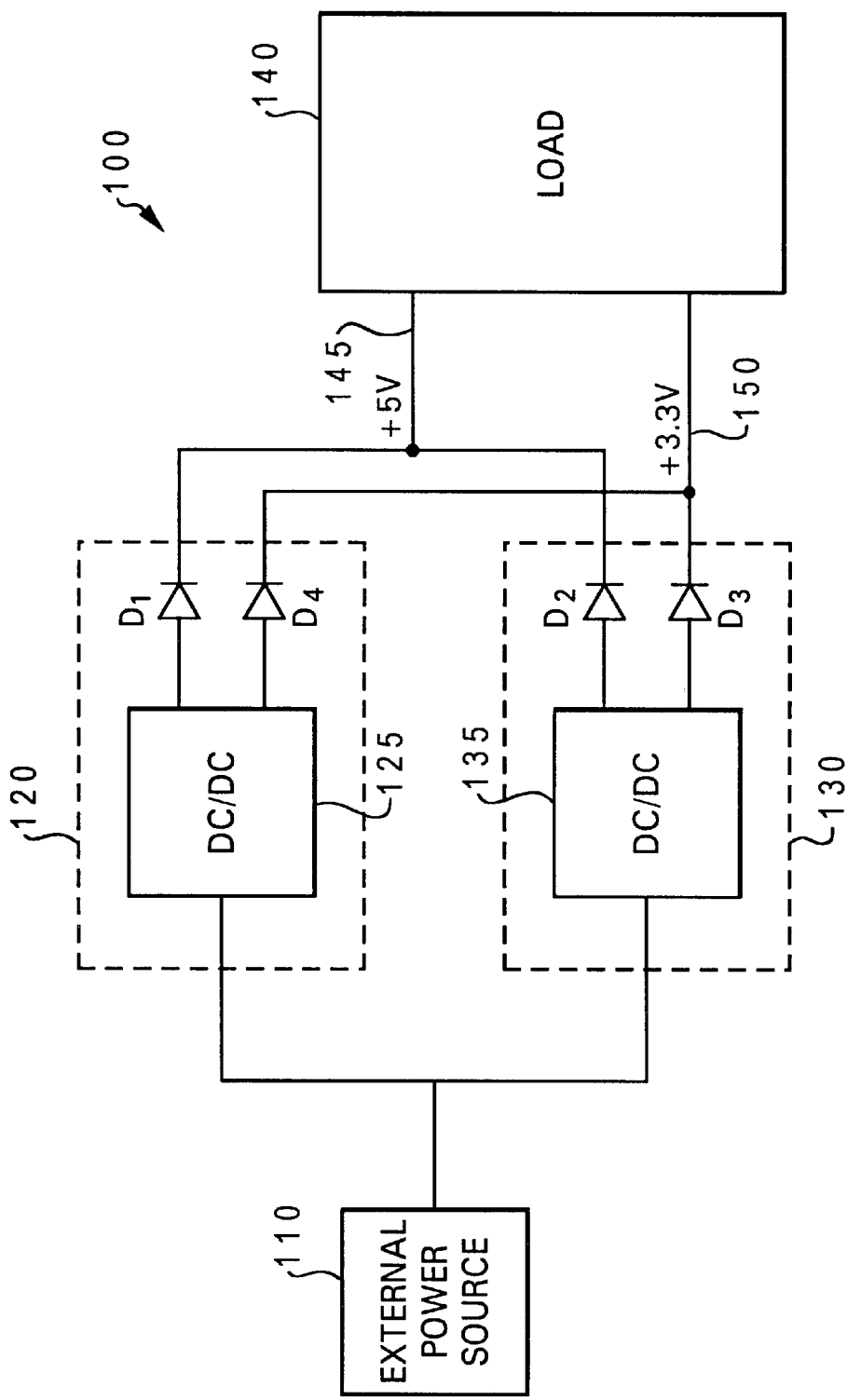
FIG. 1 illustrates an exemplary power system, employing multiple power supplies for redundancy, that provides a suitable environment for the practice of the present invention.

With reference now to the figures, and in particular, with reference to FIG. 1, there is depicted an exemplary power system 100, employing multiple power supplies for redundancy, that provides a suitable environment for the practice of the present invention. Power system 100 includes first and second power supplies 120, 130 that are coupled to an external power source 110, such as a commercial power source or a battery bank. First power supply 120 includes a first DC/DC converter 125 and first and fourth isolation diodes D1, D4. In the illustrated embodiment, first converter 125 has multiple outputs, i.e., +5V and +3.3V, coupled to a +5V common bus 145 and a +3.3V common bus 150. Second power supply 130 includes a second DC/DC converter 135 having multiple outputs with different voltage ratings, i.e., +5V and +3.3V in the depicted embodiment. As shown in the illustrated embodiment, at the different outputs of second power supply 130 are second and third isolation diodes D2, D3. First, second, third and fourth isolation diodes D1, D2, D3, D4 are configured to prevent current flowing from one power supply to another. The +5V and +3.3V outputs of first and second power supplies 120, 130 are provided to a load 140, e.g., a network server.

Figure 2:
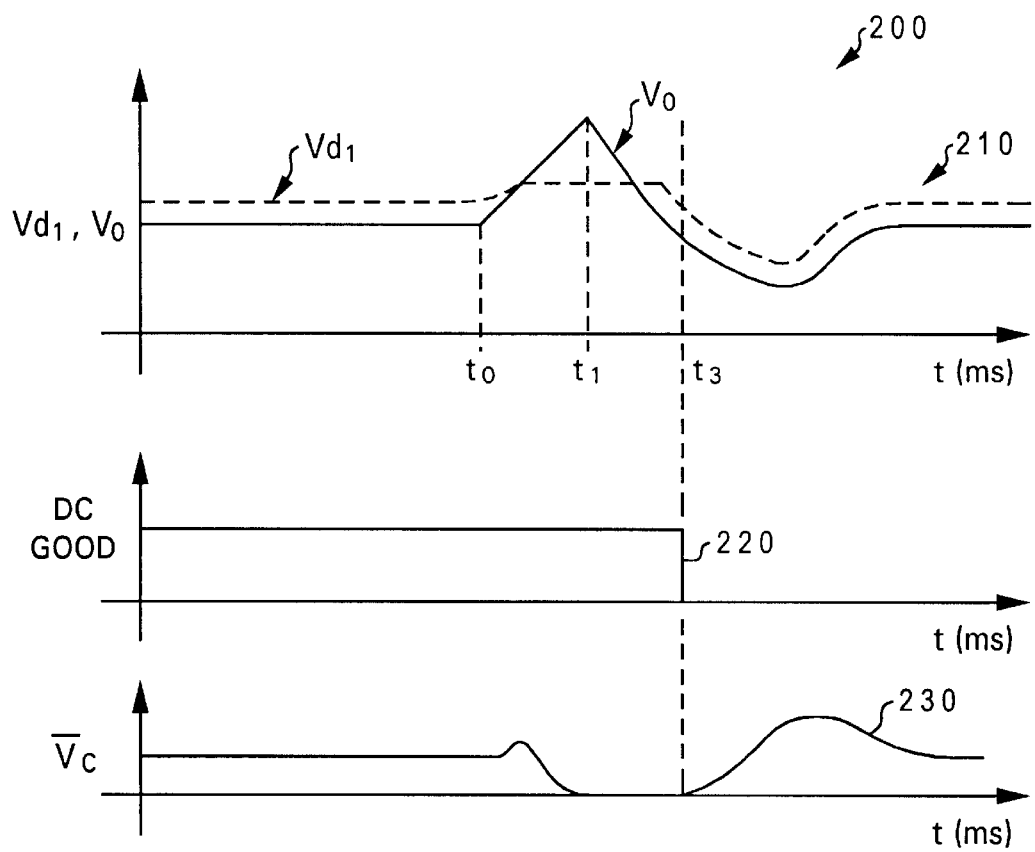
FIG. 2 illustrates exemplary signals and voltage waveforms of the power system depicted in FIG. 1.

Referring now to FIG. 2, with continuing reference to FIG. 1, there are illustrated exemplary signals and voltage waveforms 200 of power system 100 depicted in FIG. 1. Waveform 200 includes first waveform 210 that depicts voltages Vd1 and Vo at the anode and cathode nodes of first isolation diode D1, respectively. A second waveform 220 corresponds to the "DC Good" signal generated by a regulator (not shown) that monitors power system 100. A third waveform 230 illustrates the output voltage, i.e., error signal, of a conventional error amplifier (not shown) utilized in first power supply 120 to regulate an output voltage of first power supply 120.

As discussed previously and further illustrated hereinafter, the conventional power supplies, i.e., first and second power supplies 120, 130 suffer from a limitation wherein an over-voltage condition occurring in one of the power supplies may cause an overall system shutdown. For example, at time t0, an over-voltage fault is generated in second power supply's 130 +5V output stage. As a result of the over-voltage fault, output Vo at the cathode of isolation diode D1 increases, as illustrated by first waveform 210. At time t1, the over-voltage condition has increased a voltage output of second power supply 130 to a threshold value that initiates shutdown of second power supply's 130 +5V output. The problem may be further exacerbated if the fault occurs in an output that also happens to be the master output for a multiple output power supply.

Since the voltages of the power supplies are typically sensed at the cathode node of their isolation diodes, the remaining "good" power supplies, i.e., first power supply 120, is forced to operate in a "skip" or discontinuous conduction mode (DCM). As soon as second power supply's 130 +5V output is powered down, common bus's 145 voltage begins decaying until a regulation control loop in first power supply 120 responds. Under medium to full load conditions, the bus voltage on common bus 145 will drop to below its defined regulation level. This may, in turn, drive the DC good signal, i.e. second waveform 220, down that will begin to initiate a shutdown of power system 100 at time t3.

Figure 3:
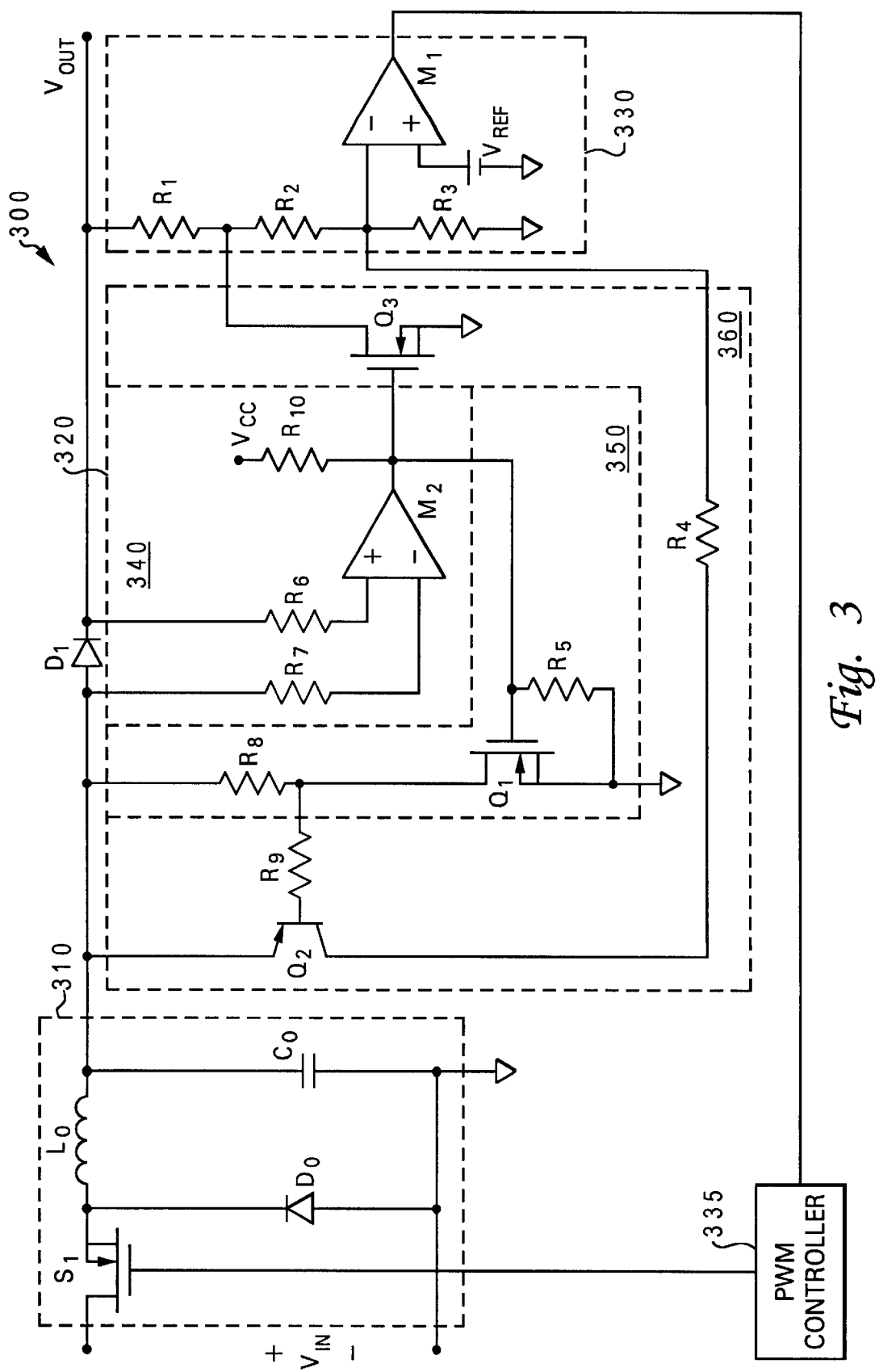
FIG. 3 illustrates a schematic of an embodiment of a power supply utilizing an over-voltage protection circuit constructed according to the principles of the present invention.

Referring now to FIG. 3, there is depicted a schematic of an embodiment of a power supply 300 utilizing an over-voltage protection circuit 320 constructed according to the principles of the present invention. Power supply 300 includes a DC/DC converter 310 that receives an input voltage Vin and converts it to an output voltage Vout, e.g., +5 or +3.3 Volts. In the illustrated embodiment, converter 310 is a buck converter, i.e., the output voltage of the converter is lower than the input voltage received by the converter. Generally, converter 310 configured as a buck converter includes a switching device S1, an output inductor Lo, an output diode Do and an output capacitor Co. It should also be readily apparent to those skilled in the art that, alternatively, in other advantageous embodiments, other converter topologies, such as boost-buck and flyback, may also be advantageously utilized. The present invention does not contemplate limiting its practice to any one type of converter topology.

Power supply 300 also includes an isolation diode D1, having anode and cathode nodes, that is coupled to output inductor Lo to provide electrical isolation from any other power supply that may be connected in parallel with power supply 300 to create a redundant power system. Also shown in the illustrated embodiment is a regulation circuit, which includes an error amplifier 330 and a pulse-width-modulated controller 335, that is used to maintain a regulated output voltage Vout by controlling the operation of switching device S1 in DC/DC converter 310. Error amplifier 330 comprises a voltage divider network of first, second and third resistors R1, R2, R3 that senses the output voltage Vout and provides the sensed voltage to an inverting node of a first operational amplifier (op-amp) M1 that is configured as a comparator. The sensed output voltage is then compared to a voltage reference source Vref that is coupled to the noninverting node of first op-amp M1. First op-amp M1, in turn, amplifies an error voltage to generate an error signal. The error signal is utilized by PWM controller 335 to control the operation of switching device S1 that, in turn, controls output voltage Vout. Thus, the output voltage Vout is kept constant under various line and load conditions. The operation and construction of PWM controllers are well known in the art and will not be described hereinafter in greater detail.

Power supply 300 further includes a over-voltage protection circuit 320 that includes a comparison circuit 340, an active bleed circuit 350 and a compensation circuit 360. Comparison circuit 340 includes sixth and seventh resistors R6, R7 that are coupled to a noninverting node and an inverting node of a second op-amp M2, respectively. Sixth and seventh resistors R6, R7 are employed to sense the voltages at the cathode and anode nodes of isolation diode D1, respectively. Comparison circuit 340 also includes a tenth resistor R10 that couples a supply voltage Vcc to an output of op-amp M2.

Active bleed circuit 350 includes a controllable switch Q1 that, in the illustrated embodiment, is a metal-oxide-semiconductor field effect transistor (MOSFET). Alternatively, in other embodiments, power transistors, such as an insulated gate bipolar transistor (IGBT) or a gate turn on thyristor (GTO), may be advantageously employed. Controllable switch Q1 is coupled to an eight resistor R8 to provide a current path for the output of DC/DC converter 310 when controllable switch Q1 is turned on, i.e., conducting. The current path provided by controllable switch Q1 and eight resistor R8 allows current to continue to flow through inductor Lo in the event that isolation diode D1 becomes reversed biased, e.g., when an over-voltage condition occurs at output voltage Vout resulting from a failure in a paralleled power supply (not shown). A fifth resistor R5 is coupled across the source and gate of controllable switch Q1 and is utilized to turn on controllable switch Q1 when the output of second op-amp M2, i.e., drive signal, is driven high. This condition corresponding to isolation diode's D1 cathode voltage being greater than its anode voltage.

Comparison circuit 360 includes a second controllable switch Q2 that is series-coupled with a fourth resistor R4 to the inverting node of first op-amp M1. Comparison circuit 360 also includes third controllable switch Q3 that is coupled to the voltage divider network of first, second and third resistors R1, R2, R3 and to the output of second op-amp M2. A ninth resistor R9 is also shown coupled to the base of second controllable switch Q2 to provide a means of controlling the operation of second controllable switch Q2. The operation of power supply 300 will hereinafter be described in greater detail with reference to FIG. 4, with continuing reference to FIG. 3.

Figure 4:
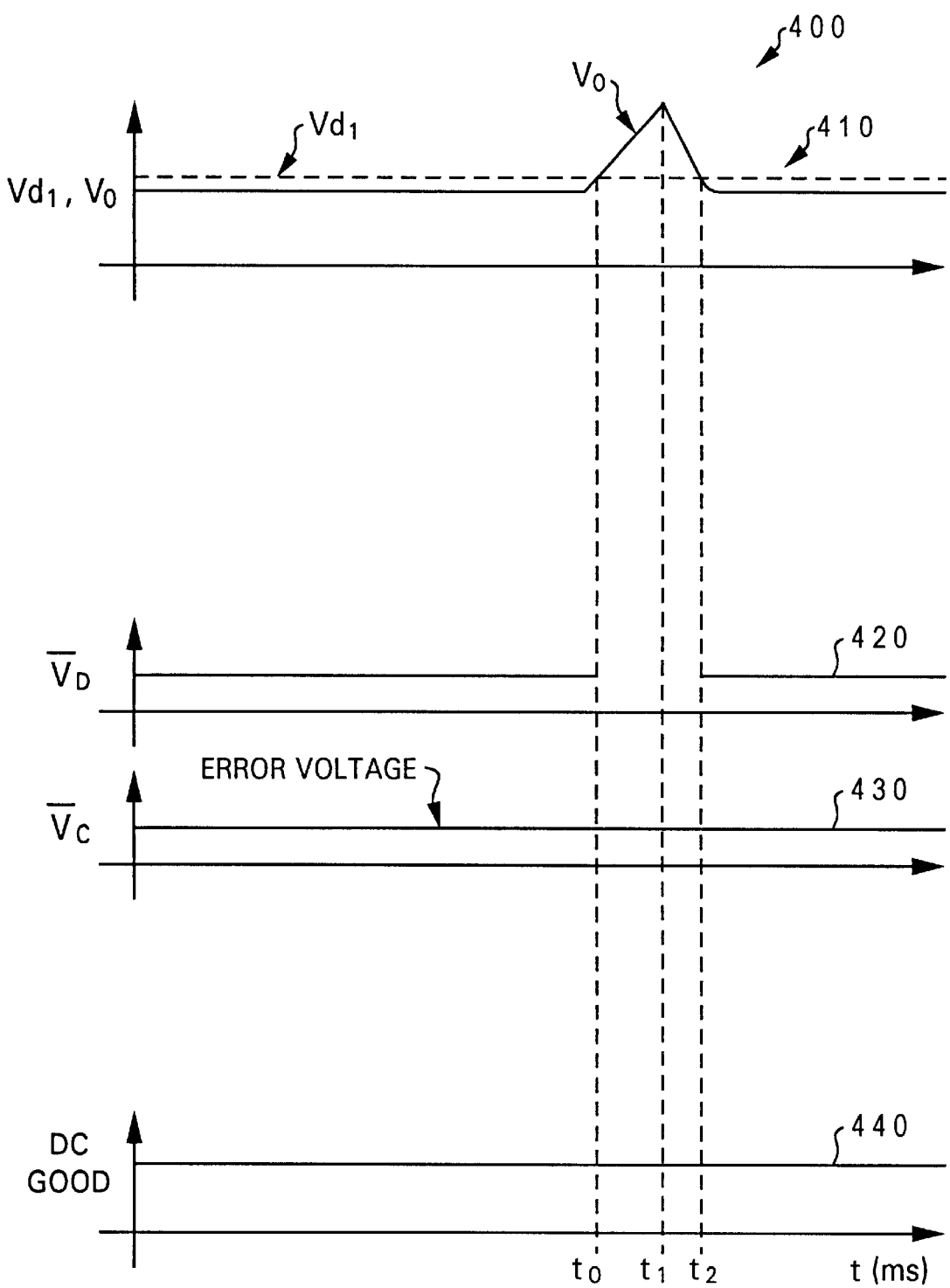
FIG. 4 illustrates exemplary drive signals and voltage waveforms of the power supply illustrated in FIG. 3.

Referring now to FIG. 4, there are illustrated exemplary drive signals and voltage waveforms 400 of power supply 300 illustrated in FIG. 3. Waveforms 400 include first waveform 410 that depicts voltages Vd1 and Vo at the anode and cathode nodes of isolation diode D1, respectively. A second waveform 420 corresponds to a voltage VD at a node (shown but not referenced) between first and second resistors R1, R2 that is coupled to third controllable switch Q3. A third waveform 430 illustrates an error voltage Vc that corresponds to the error signal generated at the output of first op-amp M1. A fourth waveform corresponds to the "DC Good" signal generated by a regulator (not shown) that monitors power supply 300.

At time t0, the output voltage Vout (illustrated by Vo in first waveform 410) begins to increase in value, as a result of an over-voltage condition due to an internal fault in another power supply (not shown) that is coupled in parallel to power supply 300. As output voltage Vout increases, isolation diode D1 becomes reverse biased, precluding any current flow to a load (not shown), when its cathode voltage exceeds its anode voltage. Concurrently, with isolation diode D1 becoming reverse biased, the output of second op-amp M2 is driven low that, in turn, turns on first and third controllable switches Q1, Q3. With Q1 conducting, a current path through eight resistor R8 allows current to continue to flow through output inductor Lo keeping DC/DC converter 310 in a continuous conduction mode of operation. Turning on third controllable switch Q3 forces the voltage at the node between first and second resistors R1, R2 low, as illustrated by second waveform 420.

Furthermore, turning on first controllable switch Q1 also forces second controllable switch Q2 to conduct, i.e., turn on. Consequently, with second controllable switch Q2 turned on, the voltage at the anode of isolation diode D1 (output voltage of DC/DC converter 300) is applied through fourth resistor R4 at the inverting node of first op-amp M1. The value of fourth resistor R4 is selected such that the voltage applied at the inverting node of first op-amp M1 remains the same value as it would be during normal operating conditions. Once this condition is met, error signal Vc generated at the output of first op-amp M1 experiences minimum changes. This will prevent first op-amp M1 from drifting into saturation.

At time t1, the over-voltage condition has exceeded a threshold value and the power supply causing the over-voltage condition is shut down and removed from the common power bus (not shown). Subsequently, output voltage Vout proceeds to decay to an established regulation value at time t3. At this time, with output voltage Vout below voltage Vd1 at the anode of isolation diode D1, isolation diode D1 becomes forward biased and proceeds to conduct current through it. Consequently, with isolation diode D1 forward biased, the output of second op-amp M2 goes high, turning off first, second and third controllable switches Q1, Q2, Q3. Power supply 300 then proceeds to resume normal operation.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. An over-voltage protection circuit for use with a power converter having an output inductor and an isolation diode coupled to an output terminal of said power converter, said over-voltage protection circuit comprising:

a comparison circuit that compares sensed voltages from the anode and cathode nodes of said isolation diode and, in response to said anode having a lower voltage than said cathode, generating a drive signal; and an active bleed circuit, coupled to said output terminal, that receives said drive signal and, in response thereto, provides a current path to keep current flowing through said output inductor to prevent said power converter from going into a discontinuous conduction (DCM) mode of operation.

2. The over-voltage protection circuit as recited in claim 1 further comprising a compensation circuit, coupled to an error amplifier, that prevents said error amplifier from drifting into a saturation mode, wherein said error amplifier compares a sensed output voltage of said power converter to a reference voltage and, in response thereto, generates an error signal to regulate said output voltage.

3. The over-voltage protection circuit as recited in claim 1 wherein said comparison circuit comprises a operational amplifier (op-amp) configured as a comparator.

4. The over-voltage protection circuit as recited in claim 1 wherein said active bleed circuit includes a controllable switch series-coupled to an impedance.

5. The over-voltage protection circuit as recited in claim 4 wherein said controllable switch is a metal-oxide-semiconductor field effect transistor (MOSFET).

6. The over-voltage protection circuit as recited in claim 4 wherein said drive signal controls the operation of said controllable switch.

7. The over-voltage protection circuit as recited in claim 1 wherein said power converter is a DC/DC converter.

8. A method for providing over-voltage protection to a power converter having an output inductor and an isolation diode coupled to an output terminal of said power converter, comprising the steps of:

sensing voltages at the anode and cathode nodes of said isolation diode;

comparing said sensed voltages from said anode and cathode nodes;

generating a drive signal in response to said anode node having a lower voltage than said cathode node; and providing a current path, in response to receiving said drive signal, allowing current to flow through said output inductor to prevent said power converter from going into a discontinuous conduction (DCM) mode of operation.

9. The method as recited in claim 8 wherein said step of comparing said sensed voltages includes utilizing an operational amplifier (op-amp).

10. The method as recited in claim 8 wherein said step of providing a current path further comprises the step of turning on a controllable switch.

11. The method as recited in claim 10 wherein said controllable switch is a metal-oxide-semiconductor field effect transistor (MOSFET).

12. A power supply, comprising:

a DC/DC converter having an output inductor and a switching device;

a regulation circuit that maintains a regulated output voltage at an output of said power supply;

an isolation diode, coupled to said output inductor; and an over-voltage protection circuit, including:

a comparison circuit that compares sensed voltages from the anode and cathode nodes of said isolation diode and, in response to said anode having a lower voltage than said cathode, generating a drive signal; and an active bleed circuit, coupled to said output inductor, that receives said drive signal and, in response thereto, provides a current path to keep current flowing through said output inductor to prevent said DC/DC converter from going into a discontinuous conduction (DCM) mode of operation.

13. The power supply as recited in claim 12 wherein said regulation circuit comprises:

an error amplifier that senses said output voltage of said power supply and provides, in response thereto, an error signal; and a pulse-width-modulation (PWM) controller that receives said error signal and provides, in response thereto, a control signal to control the operation of said switching device to maintain a regulated output voltage.

14. The power supply as recited in claim 13 wherein over-voltage protection circuit further comprises a compensation circuit, coupled to said error amplifier, that prevents said error amplifier from drifting into a saturation mode.

15. The power supply as recited in claim 12 wherein said DC/DC converter is a buck converter.

16. The power supply as recited in claim 13 wherein said switching device is a power transistor.

17. The power supply as recited in claim 12 wherein said comparison circuit comprises a operational amplifier (op-amp) configured as a comparator.

18. The power supply as recited in claim 12 wherein said active bleed circuit includes a controllable switch series-coupled to an impedance.

19. The power supply as recited in claim 18 wherein said controllable switch is a metal-oxide-semiconductor field effect transistor (MOSFET).

20. The power supply as recited in claim 18 wherein said drive signal controls the operation of said controllable switch.

* * * * *